(12) United States Patent
Nakamura

(10) Patent No.: US 11,112,640 B2
(45) Date of Patent: Sep. 7, 2021

(54) OPTICAL MEMBER

(71) Applicant: NITTO DENKO CORPORATION, Ibaraki (JP)

(72) Inventor: Kozo Nakamura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 16/764,738

(22) PCT Filed: Oct. 16, 2018

(86) PCT No.: PCT/JP2018/038411
§ 371 (c)(1),
(2) Date: May 15, 2020

(87) PCT Pub. No.: WO2019/097930
PCT Pub. Date: May 23, 2019

(65) Prior Publication Data
US 2021/0181570 A1    Jun. 17, 2021

(30) Foreign Application Priority Data
Nov. 16, 2017    (JP) .............................. JP2017-221172

(51) Int. Cl.
*G02F 1/1335*    (2006.01)

(52) U.S. Cl.
CPC .. *G02F 1/133504* (2013.01); *G02F 1/133536* (2013.01)

(58) Field of Classification Search
CPC ................................................ G02F 1/133504
See application file for complete search history.

(56) References Cited

U.S. PATENT DOCUMENTS

| 6,846,089 B2 | 1/2005 | Stevenson et al. |
| 7,820,252 B2 | 10/2010 | Higashi et al. |

(Continued)

FOREIGN PATENT DOCUMENTS

| JP | 2003-84137 A | 3/2003 |
| JP | 2009-25774 A | 2/2009 |

(Continued)

OTHER PUBLICATIONS

International Search Report dated Jan. 22, 2019, issued in counterpart International Application No. PCT/JP2018/038411 (2 pages).

(Continued)

*Primary Examiner* — Edmond C Lau
(74) *Attorney, Agent, or Firm* — Westerman, Hattori, Daniels & Adrian, LLP

(57) ABSTRACT

There is provided an optical member capable of achieving a liquid crystal display apparatus that is thin and has extremely high brightness. An optical member of the present invention includes: a first member having a function of converting direction of light; and a second member laminated on the first member via an adhesion layer. The adhesion layer has void portions, and non-contact portions are defined at an interface between the adhesion layer and the first member and/or the second member, and the adhesion layer is brought into contact with each of the first member and the second member in four corner portions of the optical member in plan view.

11 Claims, 4 Drawing Sheets

(56) References Cited

U.S. PATENT DOCUMENTS

| | | |
|---|---|---|
| 2003/0082314 A1 | 5/2003 | Higashi et al. |
| 2004/0228106 A1* | 11/2004 | Stevenson .............. G02B 5/045 |
| | | 362/627 |
| 2005/0134963 A1 | 6/2005 | Stevenson et al. |
| 2006/0083478 A1 | 4/2006 | Emmons et al. |
| 2007/0134438 A1 | 6/2007 | Fabick et al. |
| 2010/0067257 A1 | 3/2010 | Meis et al. |
| 2018/0160552 A1* | 6/2018 | Choi ................... H01L 51/5284 |

FOREIGN PATENT DOCUMENTS

| | | |
|---|---|---|
| JP | 5346066 B2 | 11/2013 |
| JP | 2017-90578 A | 5/2017 |

OTHER PUBLICATIONS

Extended (Supplementary) European Search Report dated Jul. 6, 2021 issued in counterpart application number 18877848.4 (8 pages).

* cited by examiner

OPTICAL MEMBER

TECHNICAL FIELD

The present invention relates to an optical member. More specifically, the present invention relates to an optical member in which a first member having a function of converting direction of light and a predetermined second member are laminated via an adhesion layer having void portions.

BACKGROUND ART

In recent years, as an image display apparatus, a liquid crystal display apparatus has been enjoying remarkably widespread use. In the liquid crystal display apparatus, a member having a function of converting direction of light, such as a prism sheet, a microlens array, a lenticular lens, or a diffraction grating, is used in some cases. Such member is often used by being separately arranged from other optical members. Meanwhile, along with an increase in demand for downsizing and thinning of the liquid crystal display apparatus, there is also a demand for integration of such member with another optical member (specifically bonding via an adhesion layer). However, when the member having a function of converting direction of light and another member are bonded to each other, there is a problem in that utilization efficiency of light whose direction has been converted is reduced, resulting in a liquid crystal display apparatus having insufficient brightness.

CITATION LIST

Patent Literature

[PTL 1] JP 5346066 B2

SUMMARY OF INVENTION

Technical Problem

The present invention has been made in order to solve the above-described conventional problem, and an object of the present invention is to provide an optical member capable of achieving a liquid crystal display apparatus that is thin and has extremely high brightness.

Solution to Problem

An optical member according to an embodiment of the present invention includes: a first member having a function of converting direction of light; and a second member laminated on the first member via an adhesion layer. The adhesion layer has void portions, and non-contact portions are defined at an interface between the adhesion layer and the first member and/or the second member, and the adhesion layer is brought into contact with each of the first member and the second member in four corner portions of the optical member in plan view.

In one embodiment of the present invention, the adhesion layer is brought into contact with each of the first member and the second member over an entire peripheral edge portion of the optical member in plan view.

In one embodiment of the present invention, the void portions of the adhesion layer are each defined by a depressed portion of a surface uneven structure of the adhesion layer.

In one embodiment of the present invention, the void portions of the adhesion layer include a through-hole that penetrates through the adhesion layer in a thickness direction thereof.

In one embodiment of the present invention, a void ratio of the adhesion layer in plan view is from 70% to 90%.

In one embodiment of the present invention, the optical member further includes a diffuser on an opposite side of the second member to the first member.

In one embodiment of the present invention, the diffuser is arranged so as to be spaced apart from the second member.

In one embodiment of the present invention, the second member is a laminate of two optical films laminated via another adhesion layer, and the another adhesion layer has light diffusibility.

Advantageous Effects of Invention

According to the present invention, in the optical member in which the first member having a function of converting direction of light and the predetermined second member are laminated via the adhesion layer, the void portions are arranged in the adhesion layer, and thus light can be efficiently retroreflected, despite the elimination of an air layer. Therefore, the utilization efficiency of light whose direction has been converted can be sufficiently secured to enhance the total utilization efficiency of light. As a result, the optical member capable of achieving a liquid crystal display apparatus that is thin and has extremely high brightness can be provided.

DESCRIPTION OF EMBODIMENTS

A. Combination of First Member and Second Member in Optical Member

An optical member according to one embodiment of the present invention includes: a first member having a function of converting direction of light; and a second member laminated on the first member via an adhesion layer. The adhesion layer has void portions, and non-contact portions are defined at an interface between the adhesion layer and the first member and/or the second member. The void portions are not formed in the four corners of the optical member (substantially the adhesion layer) in plan view. An example of the first member is any appropriate optical member having a function of converting direction of light. Specific examples thereof include a prism sheet, a microlens array, a lenticular lens sheet, a diffraction grating, and a light guide plate. An example of the second member is any appropriate optical film or substrate depending on purposes. Specific examples thereof include an absorption-type polarizer, a polarizer protective film, a reflective polarizer, a retardation film, a substrate with a conductive layer, a wavelength conversion film, and combinations thereof. The combination of the optical film and the like may be appropriately selected depending on purposes. That is, an example of the second member besides the optical film or the substrate alone is any appropriate optical laminate depending on purposes. Typical examples of the configuration of the optical laminate include a polarizing plate (a laminate of a polarizer protective film/an absorption-type polarizer/a polarizer protective film, or a laminate of a polarizer protective film/an absorption-type polarizer), a polarizing plate with a retardation film (a laminate of a polarizing plate/a retardation film: e.g., a circularly polarizing plate), a laminate of a polarizing plate/a reflective polarizer, and a laminate of a polarizing plate/a reflective polarizer/a wavelength conversion film. Needless to say, an optical laminate having any appropriate configuration other than the examples given above (combination of any appropriate optical films or the like) may be used as the second member.

B. Example of Optical Member

Now, as a typical example of the optical member according to the embodiment of the present invention, a case in which the first member is a prism sheet and the second member is any appropriate optical film is described with reference to the drawings. Upon reading the description of this embodiment, it is obvious to a person skilled in the art that the present invention is similarly applied to any appropriate combination of the first member and the second member and provides a similar effect.

B-1. Entire Configuration

Figure 1:
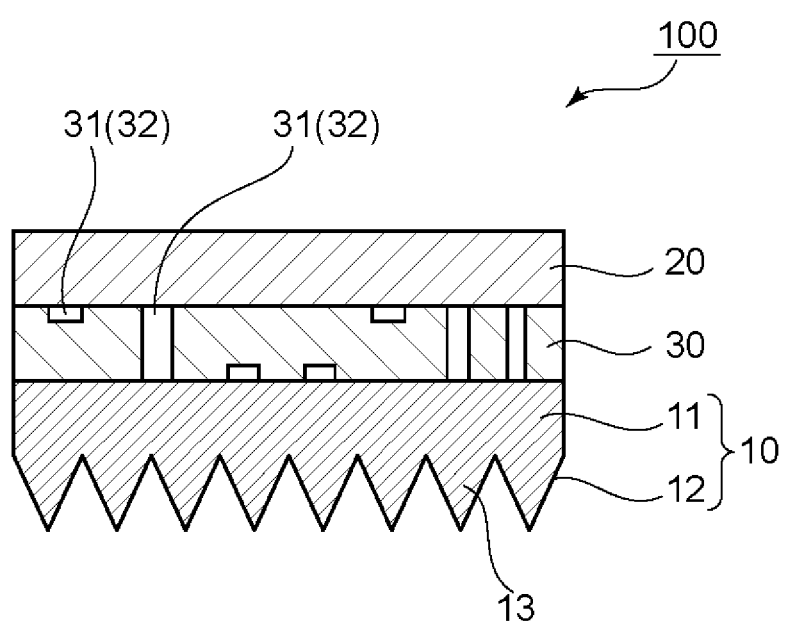
FIG. 1 is a schematic cross-sectional view for illustrating an optical member according to one embodiment of the present invention.

FIG. 1 is a schematic cross-sectional view for illustrating an optical member according to one embodiment of the present invention. An optical member 100 includes a first member (prism sheet) 10, a second member 20, and an adhesion layer 30. The prism sheet 10 typically includes a substrate portion 11 and a prism portion 12. The prism portion 12 includes a plurality of columnar unit prisms 13 arrayed on the opposite side to the substrate portion 11. In the embodiment of the present invention, the adhesion layer 30 has void portions 31. As a result of the arrangement of the void portions 31, non-contact portions 32 are defined at an interface between the adhesion layer 30 and the first member 10 and/or the second member 20. The void portions 31 are each typically defined by a depressed portion of the surface uneven structure of the adhesion layer 30. The void portions 31 may include a through-hole that penetrates through the adhesion layer 30 in the thickness direction thereof, and may be constituted of substantially only the through-holes.

As described above, in the optical member according to the embodiment of the present invention, the prism sheet 10 and the second member 20 are integrated with each other. When the prism sheet is incorporated and integrated into the optical member as described above, an air layer between the prism sheet and the layer adjacent thereto can be eliminated, and hence a contribution can be made to the thinning of a liquid crystal display apparatus. The thinning of the liquid crystal display apparatus broadens the range of design choices, and hence has a high commercial value. Further, the integration of the prism sheet can prevent the prism sheet from being flawed due to friction during mounting of the prism sheet onto a surface light source device (a backlight unit, substantially a light guide plate), and hence can provide a liquid crystal display apparatus capable of preventing cloudiness of its display resulting from such flaw and excellent in mechanical strength.

In the embodiment of the present invention, as described above, the adhesion layer 30 has the void portions 31. The formation of the void portions provides the following advantage. In a conventional optical member in which an air layer is eliminated by integrating a prism sheet, for example, when light from a light source on aback-surface side enters, the light is not retroreflected, and hence the light leaks to a viewer side. As a result, as compared to a case in which an air layer is present (a case in which the first member, such as a prism sheet, is separately arranged), a problem often arises in that the utilization efficiency of light is reduced owing to the small amount of light to be output in a front direction and the occurrence of light in such a direction that the light cannot be output to the viewer side. Particularly when the member having a function of converting direction of light, such as a prism sheet (other examples include a microlens array, a lenticular lens sheet, a diffraction grating, and a light guide plate), is integrated, the utilization efficiency of light whose direction has been converted is reduced, and hence the problem as described above becomes remarkable. Meanwhile, when the void portions are formed in the adhesion layer, light is efficiently retroreflected in the same manner as when an air layer is present. Therefore, the utilization efficiency of light can be enhanced by sufficiently securing the amount of light to be output in the front direction and suppressing the occurrence of light in such a direction that the light cannot be output to the viewer side. As a result, a liquid crystal display apparatus having high brightness while achieving remarkable thinning through the elimination of an air layer can be achieved.

As described above, the void portions are not formed in the four corners of the optical member (substantially the adhesion layer) in plan view. In other words, the adhesion layer 30 is brought into contact with each of the first member (the prism sheet in the illustrated example) 10 and the second member 20 in four corner portions of the optical member in plan view. With such configuration, the first member (the prism sheet in the illustrated example) 10 and the second member 20 can be allowed to adhere to each other (integrated with each other) with sufficient strength. Further, the utilization efficiency of light can be improved. It is more preferred that the void portions be not formed in the peripheral edge portion of the optical member (substantially adhesion layer) in plan view. In other words, the adhesion layer 30 is brought into contact with each of the first member (the prism sheet in the illustrated example) 10 and the second member 20 over the entire peripheral edge portion of the optical member in plan view. With such configuration, adhesive strength between the first member and the second member and the utilization efficiency of light can both be further improved.

Figure 2:
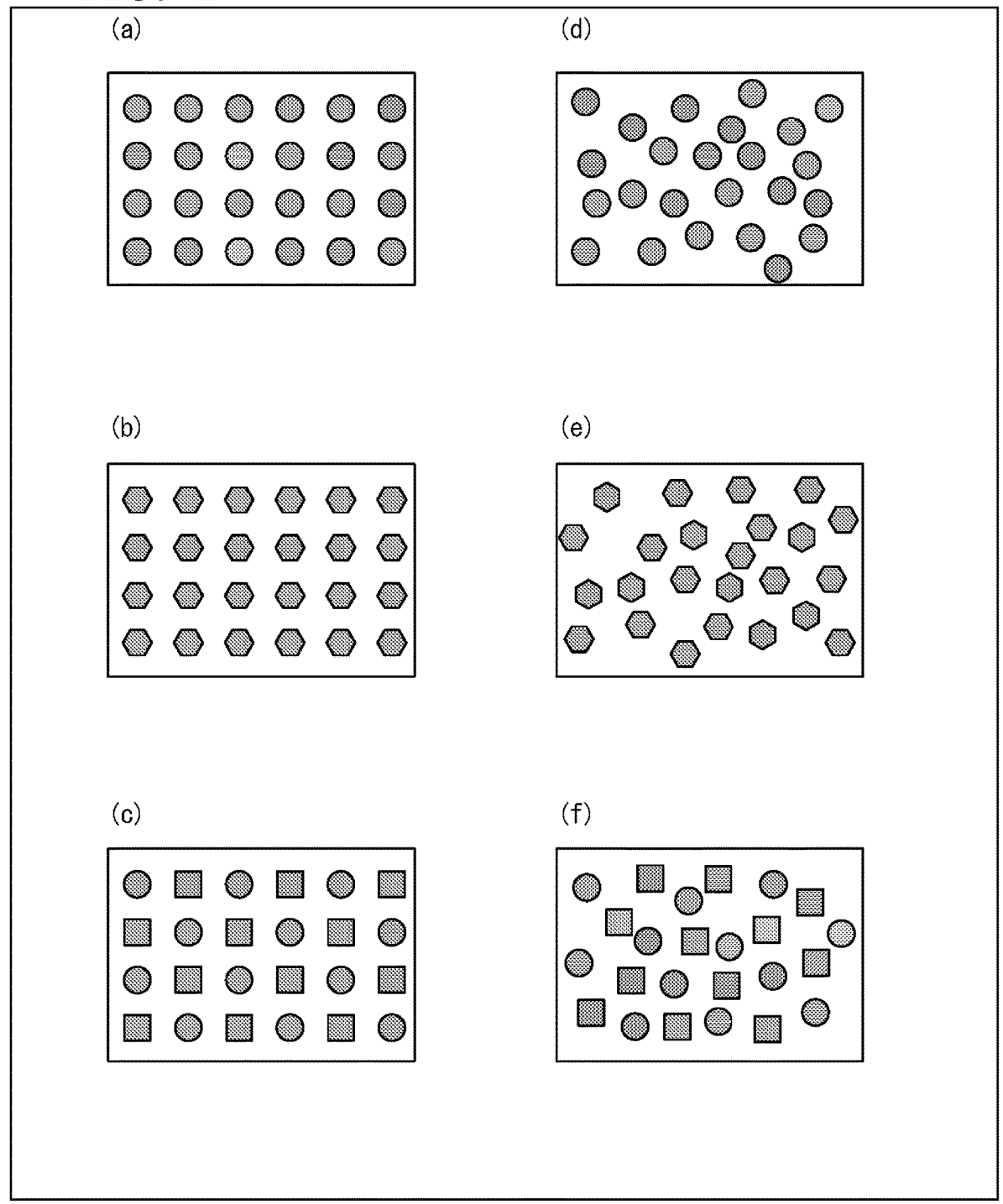
FIG. 2 are schematic plan views for illustrating examples of the plan-view shapes of void portions of an adhesion layer that may be used in embodiments of the present invention.

Any appropriate shape may be adopted as the plan-view shape of each of the void portions. Specific examples thereof include a circular shape, an elliptical shape, an equilateral triangle, an isosceles triangle, a scalene triangle, a square, a rectangle, a rhombus, a trapezoid, a scalene quadrilateral, a polygon (e.g., a pentagon, a hexagon, a heptagon, or an octagon), a star shape, a scale like shape, and an amorphous shape. Those shapes may be used in combination thereof. In plan view, the void portions may be regularly arranged, for example, as illustrated in FIG. 2(a) to FIG. 2(c), or may be irregularly arranged, for example, as illustrated in FIG. 2(d) to FIG. 2(f). The arrangement (in plan view) of the void portions may be the same or different between both surfaces of the adhesion layer (first member-side surface and second member-side surface). When the void portions are constituted of only through-holes, the arrangement (in plan view) of the void portions is the same on both surfaces of the adhesion layer.

The void ratio of the adhesion layer in plan view is preferably from 70% to 90%, more preferably from 73% to 87%, still more preferably from 75% to 85%. When the void ratio falls within such range, the adhesive strength between the first member and the second member and the utilization efficiency of light can both be improved. Further, a synergistic effect with the formation positions of the void portions described above can be obtained. The phrase "void ratio of the adhesion layer in plan view" as used herein means the average of the void ratios of both surfaces of the adhesion layer.

The adhesion layer 30 may be formed of any appropriate adhesive or pressure-sensitive adhesive as long as the adhesion layer 30 has the predetermined void portions 31. The adhesion layer may be preferably formed of a pressure-sensitive adhesive. This is because the pressure-sensitive adhesive has an appropriate thickness, and hence facilitates the formation of the void portions that can enhance the utilization efficiency of light.

Figure 3:
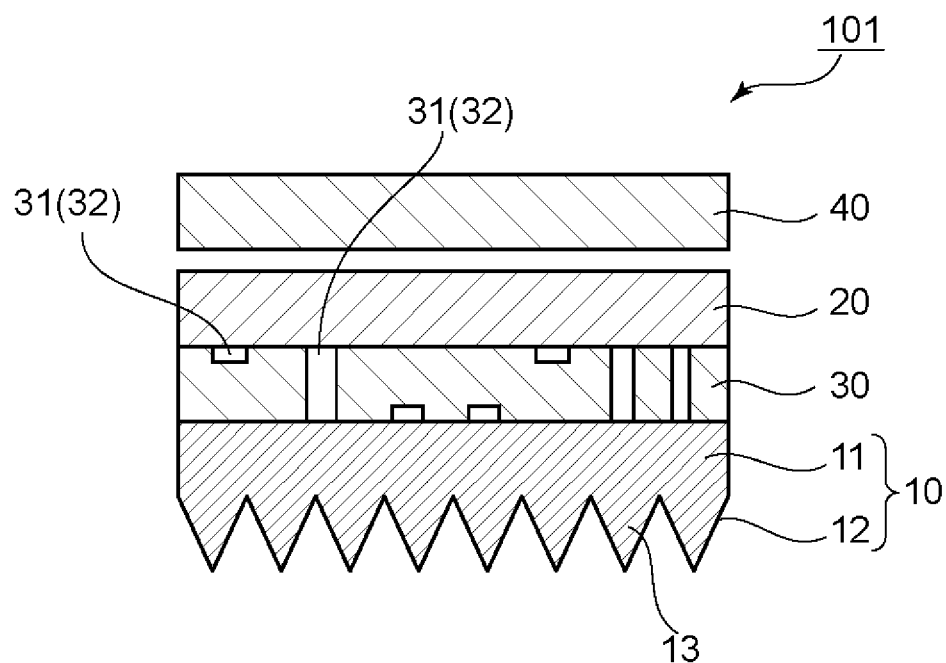
FIG. 3 is a schematic cross-sectional view for illustrating an optical member according to another embodiment of the present invention.

FIG. 3 is a schematic cross-sectional view for illustrating an optical member according to another embodiment of the present invention. An optical member 101 of the illustrated example further includes a diffuser 40 on the opposite side of the second member 20 to the first member. When the diffuser is arranged, the void portions of the adhesion layer can be made inconspicuous, and hence an optical member excellent in external appearance can be obtained. The diffuser 40 is preferably arranged so as to be spaced apart from the second member 20. When the diffuser is arranged so as to be spaced apart, an optical member further excellent in external appearance can be obtained. A spacing distance is, for example, 1 mm or more, preferably from 1 mm to 10 mm, more preferably from 2 mm to 5=. The spacing distance may be adjusted, for example, with a spacer.

Figure 4:
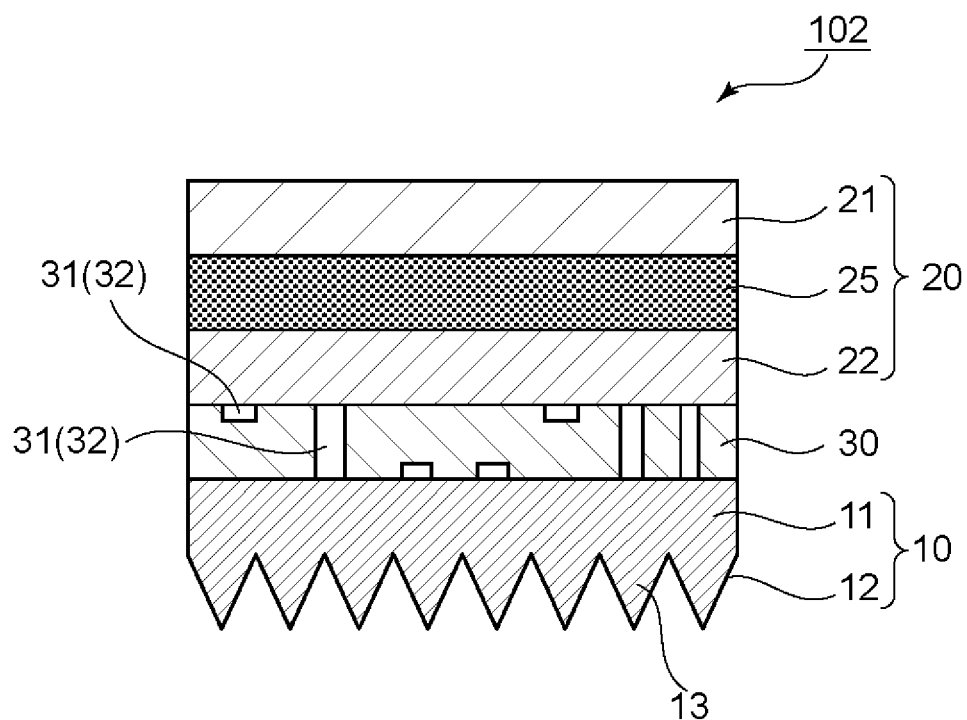
FIG. 4 is a schematic cross-sectional view for illustrating an optical member according to still another embodiment of the present invention.

FIG. 4 is a schematic cross-sectional view for illustrating an optical member according to still another embodiment of the present invention. In an optical member 102 of the illustrated example, the second member 20 is a laminate of two optical films 21 and 22 laminated via another adhesion layer 25. In this embodiment, the other adhesion layer 25 preferably has light diffusibility. With such configuration, without the use of the diffuser as illustrated in FIG. 3, the void portions of the adhesion layer 30 can be made inconspicuous, and hence an optical member excellent in external appearance can be obtained. The embodiment of FIG. 4 is an alternative embodiment to the embodiment of FIG. 3. The other adhesion layer 25 may be preferably formed of a light-diffusing pressure-sensitive adhesive. When the other adhesion layer does not have light diffusibility, the diffuser as illustrated in FIG. 3 may be preferably used on the opposite side of the second member to the first member.

In the embodiments described with reference to FIG. 1 to FIG. 4, the prism portion 12 of the prism sheet 10 is arranged on the opposite side to the adhesion layer 30, but the prism portion 12 may be arranged on the adhesion layer 30 side.

Now, the details of the first member (prism sheet serving as a typical example), the adhesion layer, and the second member that are included in the optical member of this embodiment are described.

B-2. Prism Sheet

As described above, the prism sheet 10 typically includes the substrate portion 11 and the prism portion 12. When the optical member of the present invention is arranged on the backlight side of a liquid crystal display apparatus, the prism sheet 10 guides light, which has been output from the backlight unit, as light having the maximum intensity in an approximately normal direction of the liquid crystal display apparatus to a polarizing plate by means of, for example, total reflection in the prism portion 12. The substrate portion 11 may be omitted depending on purposes and the configuration of the prism sheet. For example, when a layer adjacent to the substrate portion side of the prism sheet can function as a supporting member, the substrate portion 11 may be omitted.

B-2-1. Prism Portion

The prism sheet 10 (substantially the prism portion 12) typically includes an array of the plurality of columnar unit prisms 13, which are convex toward the opposite side to the substrate portion 11. It is preferred that each of the unit prisms 13 be columnar, and be configured such that its lengthwise direction (edge line direction) is a direction approximately perpendicular, or a direction approximately parallel, to the transmission axis of a polarizing plate in a liquid crystal display apparatus. In the illustrated example, the prism sheet is arranged so that the unit prisms are on the opposite side to the adhesion layer, but the prism sheet may be arranged so that the unit prisms are on the adhesion layer side.

Any appropriate configuration may be adopted for the shape of each of the unit prisms 13 as long as the effect of the present invention is obtained. The shape of a section of each of the unit prisms 13 parallel to its array direction and parallel to its thickness direction may be a triangular shape, or may be any other shape (e.g., such a shape that one or both of the inclined planes of a triangle has a plurality of flat surfaces having different tilt angles). The triangular shape may be a shape asymmetric with respect to a straight line passing the apex of the unit prism and perpendicular to the surface of the sheet (e.g., a scalene triangle), or may be a shape symmetric with respect to the straight line (e.g., an isosceles triangle). Further, the apex of the unit prism may have a chamfered curved surface shape, or may have a shape whose section is a trapezoid, the shape being obtained by such cutting that its tip becomes a flat surface. Detailed shapes of the unit prisms 13 may be appropriately set depending on purposes. For example, a configuration described in JP H11(1999)-84111 A may be adopted for each of the unit prisms 13.

All the unit prisms 13 may have the same height, or the unit prisms may have different heights. When the unit prisms have different heights, in one embodiment, the unit prisms have two heights. For example, a unit prism having the larger height and a unit prism having the smaller height may be alternately arranged, a unit prism having the larger (or smaller) height may be arranged for, for example, every three, four, or five unit prisms, the unit prisms may be irregularly arranged depending on purposes, or the unit prisms may be completely randomly arranged. In another embodiment, the unit prisms have three or more heights.

B-2-2. Substrate Portion

When the substrate portion 11 is arranged in the prism sheet 10, the substrate portion 11 and the prism portion 12 may be integrally formed by, for example, subjecting a single material to extrusion, or the prism port ion may be shaped on a film for the substrate portion. The thickness of the substrate portion is preferably from 25 μm to 150 μm. With such thickness, the handling property and strength of the prism sheet can be excellent.

Any appropriate material may be adopted as a material for forming the substrate portion 11 depending on purposes and the configuration of the prism sheet. When the prism portion is shaped on the film for the substrate portion, a specific example of the film for the substrate portion is a film formed of cellulose triacetate (TAC), a (meth)acrylic resin, such as polymethyl methacrylate (PMMA), or a polycarbonate (PC) resin. The film is preferably an unstretched film.

When the substrate portion 11 and the prism portion 12 are integrally formed of a single material, the same material as a material for forming the prism portion when the prism portion is shaped on the film for the substrate portion may be used as the material. Examples of the material for forming the prism portion include epoxy acrylate-based and urethane acrylate-based reactive resins (e.g., an ionizing radiation-curable resin). When the prism sheet of an integral configuration is formed, a polyester resin, such as PC or PET, an acrylic resin, such as PMMA or MS, or an optically transparent thermoplastic resin, such as cyclic polyolefin, may be used.

The substrate portion 11 preferably substantially has optical isotropy. The phrase "substantially has optical isotropy" as used herein means that a retardation value is so small as to have substantially no influences on the optical characteristics of a liquid crystal display apparatus. For example, the in-plane retardation Re of the substrate portion is preferably 20 nm or less, more preferably 10 nm or less. The in-plane retardation Re is an in-plane retardation value measured with light having a wavelength of 590 nm at 23° C. The in-plane retardation Re is expressed by Re=(nx−ny)xd. In the equation, nx represents a refractive index in a direction in which a refractive index becomes maximum in the plane of the optical member (i.e., a slow axis direction), ny represents a refractive index in a direction perpendicular to the slow axis in the plane (i.e., a fast axis direction), and "d" represents the thickness (nm) of the optical member.

Further, the substrate portion 11 has a photoelastic coefficient of preferably from $-10\times10^{-12}$ $m^2/N$ to $10\times10^{-12}$ $m^2/N$, more preferably from $-5\times10^{-12}$ $m^2/N$ to $5\times10^{-12}$ $m^2/N$, still more preferably from $-3\times10^{-12}$ $m^2/N$ to $3\times10^{-12}$ $m^2/N$.

B-3. Adhesion Layer

The adhesion layer 30 may be formed of any appropriate adhesive or pressure-sensitive adhesive. Typical examples of a material serving as such adhesive or pressure-sensitive adhesive include an acrylic resin, a polyvinyl alcohol resin, an epoxy resin, an unsaturated polyester, a urethane resin, a urea resin, a melamine resin, and a phenol resin. As required, a curing agent may be used in combination therewith. Of those, an acrylic resin is preferred. This is because the acrylic resin is easily available and can achieve desired characteristics through the adjustment of, for example, the kinds and blending amounts of copolymerization components. A pressure-sensitive adhesive containing an acrylic resin is more preferred. Examples of the monomer component (copolymerization component) for forming the acrylic resin include: (meth)acrylic acid (C1 to C20) alkyl esters, such as methyl (meth)acrylate, ethyl (meth)acrylate, n-propyl (meth)acrylate, isopropyl (meth)acrylate, 2-methyl-2-nitropropyl (meth)acrylate, n-butyl (meth)acrylate, isobutyl (meth)acrylate, s-butyl (meth)acrylate, t-butyl (meth)acrylate, n-pentyl (meth)acrylate, t-pentyl (meth)acrylate, 3-pentyl (meth)acrylate, 2,2-dimethylbutyl (meth)acrylate, n-hexyl (meth)acrylate, cetyl (meth)acrylate, n-octyl (meth)acrylate, 2-ethylhexyl (meth)acrylate, 4-methyl-2-propylpentyl (meth)acrylate, and n-octadecyl (meth)acrylate; cycloalkyl (meth)acrylates, such as cyclohexyl (meth)acrylate and cyclopentyl (meth)acrylate; aralkyl (meth)acrylates, such as benzyl (meth)acrylate; polycyclic (meth)acrylates, such as 2-isobornyl (meth)acrylate, 2-norbornylmethyl (meth)acrylate, 5-norbornen-2-yl-methyl (meth)acrylate, 3-methyl-2-norbornylmethyl (meth)acrylate, dicyclopentenyl (meth)acrylate, dicyclopentenyloxyethyl (meth)acrylate, and dicyclopentanyl (meth)acrylate; alkoxy group or phenoxy group-containing (meth)acrylates, such as 2-methoxyethyl (meth)acrylate, 2-ethoxyethyl (meth)acrylate, 2-methoxymethoxyethyl (meth)acrylate, 3-methoxybutyl (meth)acrylate, ethylcarbitol (meth)acrylate, phenoxyethyl (meth)acrylate, and an alkylphenoxy polyethylene glycol (meth)acrylate; N-alkyl group-containing (meth)acrylamide derivatives, such as N-methyl (meth)acrylamide, N,N-dimethyl (meth)acrylamide, N,N-diethyl (meth)acrylamide, N-isopropyl (meth)acrylamide, N-butyl (meth)acrylamide, and N-hexyl (meth)acrylamide; N-hydroxyalkyl group-containing (meth)acrylamide derivatives, such as N-methylol (meth)acrylamide, N-hydroxyethyl (meth)acrylamide, and N-methylol-N-propane (meth)acrylamide; and N-alkoxy group-containing (meth)acrylamide derivatives, such as N-methoxymethyl acrylamide and N-ethoxymethyl acrylamide. In addition to the above-mentioned compounds, acyclic ether group-containing (meth)acrylamide derivative may also be used. A specific example thereof is a heterocycle-containing (meth)acrylamide derivative in which a nitrogen atom of a (meth)acrylamide group forms a heterocycle. Examples thereof include N-acryloylmorpholine, N-acryloylpiperidine, N-methacryloylpiperidine, and N-acryloylpyrrolidine. Those compounds may be used alone or in combination thereof. Desired characteristics can be achieved by adjusting the kind, number, or copolymerization ratio of those monomers.

When the adhesion layer is formed of the adhesive, its thickness is preferably from 0.01 µm to 2 µm. When the adhesion layer is formed of the pressure-sensitive adhesive, its thickness is preferably from 3 µm to 200 µm.

The void portions 31 are as described in the foregoing section B-1. The void portions may be formed by any appropriate method. A specific example thereof is mechanical punching (e.g., punching, chisel punching, a plotter, or a water jet) or the removal of predetermined portions of the adhesion layer (e.g., laser processing or chemical dissolution).

The mechanical punching may be performed in any appropriate manner. For example, the mechanical punching may be performed using a punching apparatus in which a plurality of punching blades are arranged according to a predetermined pattern, or may be performed by moving a punching blade with an apparatus such as an XY plotter.

The laser processing may be performed in any appropriate manner. As a laser, any appropriate laser may be adopted. Specific examples thereof include: gas lasers, such as a $CO_2$ laser and an excimer laser; solid lasers, such as a YAG laser; and semiconductor lasers. Any appropriate conditions may be adopted as conditions for irradiation with laser light (an output condition, a moving speed, and the number of times) depending on, for example, the material for forming the adhesion layer (substantially the adhesive or the pressure-sensitive adhesive), the thickness of the adhesion layer, the plan-view shapes of the void portions, and the void ratio in plan view.

B-4. Modified Examples of First Member

Embodiments in the case where the first member is the prism sheet have been described in the section B-1 to the section B-3. However, as described above, it is obvious to a person skilled in the art that the present invention is similarly applied to any appropriate first member having a function of converting direction of light and provides a similar effect. As described above, modified examples of the first member are specifically exemplified by a microlens array, a lenticular lens sheet, a diffraction grating, and a light guide plate.

C. Second Member

As described above, the second member may be any appropriate optical film or substrate depending on purposes, and specific examples thereof include an absorption-type polarizer, a polarizer protective film, a reflective polarizer, a retardation film, a substrate with a conductive layer, a wavelength conversion film, and combinations thereof. Now, as typical examples, the absorption-type polarizer, the polarizer protective film, the reflective polarizer, the wavelength conversion film, and a laminate of a polarizing plate and the reflective polarizer are described. However, it is obvious to a person skilled in the art that the present invention is similarly applied to any other optical film, substrate, or combination thereof (optical laminate) and provides a similar effect.

C-1. Absorption-Type Polarizer

Any appropriate polarizer may be adopted as the absorption-type polarizer. For example, a resin film for forming the polarizer may be a single-layer resin film, or may be a laminate of two or more layers.

Specific examples of the polarizer constituted of a single-layer resin film include: a product obtained by subjecting a hydrophilic polymer film such as a polyvinyl alcohol-based film, a partially formalized polyvinyl alcohol-based film, or an ethylene-vinyl acetate copolymer-based partially saponified film to dyeing treatment with a dichromatic substance such as iodine or a dichromatic dye and stretching treatment; and a polyene-based alignment film such as a dehydration-treated product of polyvinyl alcohol or a dehydrochlorination-treated product of polyvinyl chloride. Of those, a polarizer obtained by dyeing a polyvinyl alcohol-based film with iodine and uniaxially stretching the resultant is preferably used because of its excellent optical characteristics.

The dyeing with iodine is performed by, for example, immersing the polyvinyl alcohol-based film in an aqueous solution of iodine. The stretching ratio of the uniaxial stretching is preferably from 3 to 7 times. The stretching may be performed after the dyeing treatment or may be performed simultaneously with the dyeing. In addition, the stretching may be performed before the dyeing. The polyvinyl alcohol-based film is subjected to, for example, swelling treatment, cross-linking treatment, washing treatment, or drying treatment as required. For example, when the polyvinyl alcohol-based film is washed with water by being immersed in water before the dyeing, the soil or antiblocking agent on the surface of the polyvinyl alcohol-based film can be washed off. In addition, the polyvinyl alcohol-based film can be swollen to prevent dyeing unevenness or the like.

The polarizer obtained by using the laminate is, for example, a polarizer obtained by using a laminate of a resin substrate and a PVA-based resin layer (PVA-based resin film) laminated on the resin substrate, or a laminate of a resin substrate and a PVA-based resin layer formed on the resin substrate through application. The polarizer obtained by using the laminate of the resin substrate and the PVA-based resin layer formed on the resin substrate through application may be produced by, for example, a method involving: applying a PVA-based resin solution onto the resin substrate; drying the solution to form the PVA-based resin layer on the resin substrate, thereby providing the laminate of the resin substrate and the PVA-based resin layer; and stretching and dyeing the laminate to turn the PVA-based resin layer into the polarizer. In this embodiment, the stretching typically includes the stretching of the laminate under a state in which the laminate is immersed in an aqueous solution of boric acid. The stretching may further include the in-air stretching of the laminate at high temperature (e.g., 95° C. or more) before the stretching in the aqueous solution of boric acid as required. The resultant laminate of the resin substrate and the polarizer may be used as it is (i.e., the resin substrate may be used as a protective layer for the polarizer). Alternatively, a product obtained as described below may be used: the resin substrate is peeled from the laminate of the resin substrate and the polarizer, and any appropriate protective layer in accordance with purposes is laminated on the peeled surface. Details of such method of producing a polarizer are disclosed in, for example, Japanese Patent Application Laid-open No. 2012-73580. The entire disclosure of the laid-open publication is incorporated herein by reference.

The thickness of the polarizer is preferably 25 μm or less, more preferably from 3 μm to 22 μm, still more preferably from 3 μm to 15 μm, particularly preferably from 3 μm to 12 μm. When C-2. Polarizer Protective Film The polarizer protective film is formed of any appropriate film. As a material serving as a main component of the film, there are specifically given, for example, cellulose-based resins, such as triacetylcellulose (TAC), and transparent resins, such as polyester-based, polyvinyl alcohol-based, polycarbonate-based, polyamide-based, polyimide-based, polyether sulfone-based, polysulfone-based, polystyrene-based, polynorbornene-based, polyolefin-based, (meth) acrylic, and acetate-based resins. There are also given, for example, thermosetting resins or UV-curable resins, such as (meth)acrylic, urethane-based, (meth)acrylic urethane-based, epoxy-based, and silicone-based resins. There are also given, for example, glassy polymers, such as a siloxane-based polymer. In addition, a polymer film described in JP 2001-343529 A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as a material for the film, and the composition is, for example, a resin composition containing an alternating copolymer formed of isobutene and N-methylmaleimide, and an acrylonitrile-styrene copolymer. The polymer film may be, for example, an extrudate of the resin composition. The thickness of the polarizer protective film is preferably 20 μm to 100 μm.

C-3. Reflective Polarizer

The reflective polarizer has a function of transmitting polarized light in a specific polarization state (polarization direction) and reflecting light in any other polarization state. The reflective polarizer may be of a linearly polarized light separation type, or may be of a circularly polarized light separation type. Description is given below by taking the linearly polarized light separation-type reflective polarizer as an example. An example of the circularly polarized light separation-type reflective polarizer is a laminate of a film obtained by fixing a cholesteric liquid crystal and a λ/4 plate.

Figure 5:
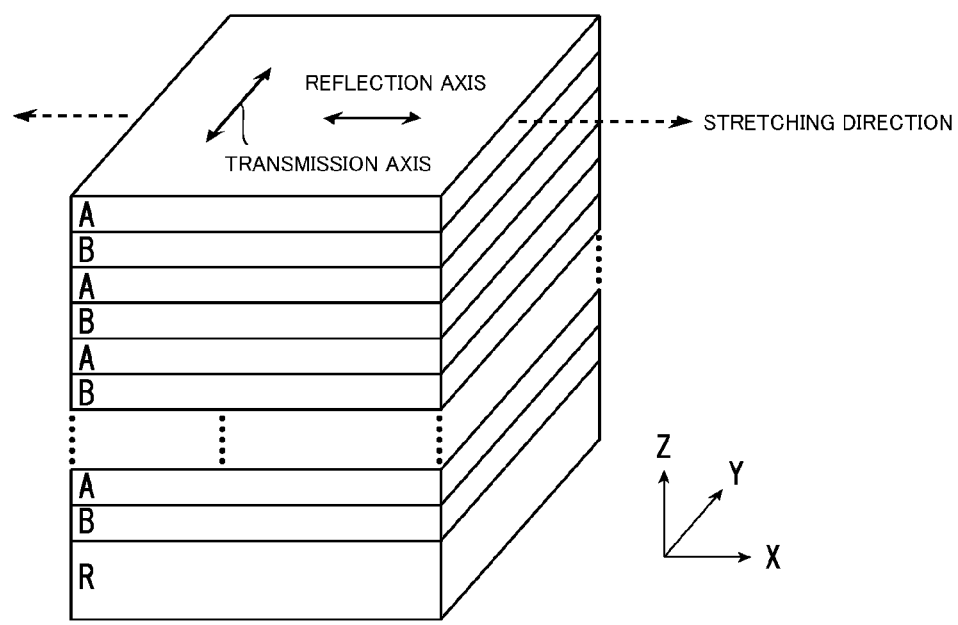
FIG. 5 is a schematic perspective view of an example of a reflective polarizer that may be used as a second member of the optical member of the present invention.

FIG. 5 is a schematic perspective view of an example of the reflective polarizer. The reflective polarizer is a multilayer laminate obtained by alternately laminating a layer A having birefringence and a layer B substantially free of birefringence. For example, the total number of the layers of such multilayer laminate may be from 50 to 1,000. In the illustrated example, a refractive index nx in the x-axis direction of the layer A is larger than a refractive index ny in the y-axis direction thereof, and a refractive index nx in the x-axis direction of the layer B and a refractive index ny in the y-axis direction thereof are substantially equal to each other. Therefore, a refractive index difference between the layer A and the layer B is large in the x-axis direction, and is substantially zero in the y-axis direction. As a result, the x-axis direction serves as a reflection axis and the y-axis direction serves as a transmission axis. The refractive index difference between the layer A and the layer B in the x-axis direction is preferably from 0.2 to 0.3. The x-axis direction corresponds to the stretching direction of the reflective polarizer in a method of producing the reflective polarizer.

The layer A is preferably formed of a material that expresses birefringence when stretched. Typical examples of such material include naphthalenedicarboxylic acid polyester (e.g., polyethylene naphthalate), polycarbonate, and an acrylic resin (e.g., polymethyl methacrylate). Of those, polyethylene naphthalate is preferred. The layer B is preferably formed of a material that is substantially free of expressing birefringence even when stretched. A typical example of such material is a copolyester of naphthalenedicarboxylic acid and terephthalic acid.

The reflective polarizer transmits light having a first polarization direction (e.g., a p-wave) and reflects light having a second polarization direction perpendicular to the first polarization direction (e.g., a s-wave) at an interface between the layer A and the layer B. Part of the reflected light passes as light having the first polarization direction through the interface between the layer A and the layer B, and the other part thereof is reflected as light having the second polarization direction. Such reflection and transmission are repeated many times in the reflective polarizer, and hence the utilization efficiency of light can be improved.

In one embodiment, the reflective polarizer may include, as illustrated in FIG. 5, a reflective layer R as the outermost layer on the wavelength conversion layer 10 side. When the reflective layer R is arranged, light that has finally returned to the outermost portion of the reflective polarizer without being utilized can be further utilized, and hence the utilization efficiency of the light can be further improved. The reflective layer R typically expresses a reflecting function by virtue of the multilayer structure of a polyester resin layer.

The reflective polarizer may be typically produced by combining co-extrusion and lateral stretching. The co-extrusion may be performed by any appropriate system. For example, the system may be a feed block system, or may be a multi-manifold system. For example, a material for forming the layer A and a material for forming the layer B are extruded in a feed block, and are then formed into a plurality of layers with a multiplier. Such apparatus for forming the materials into a plurality of layers is known to one skilled in the art. Next, the resultant multilayer laminate having an elongate shape is typically stretched in a direction (TD) perpendicular to its conveying direction. The material for forming the layer A (e.g., polyethylene naphthalate) is increased in refractive index only in the stretching direction by the lateral stretching, and as a result, expresses birefringence. The material for forming the layer B (e.g., copolyester of naphthalenedicarboxylic acid and terephthalic acid) is not increased in refractive index in any direction even by the lateral stretching. As a result, a reflective polarizer having a reflection axis in the stretching direction (TD) and having a transmission axis in the conveying direction (MD) can be obtained (TD corresponds to the x-axis direction of FIG. 5, and MD corresponds to the y-axis direction thereof). A stretching operation may be performed with any appropriate apparatus.

A polarizer described in, for example, JP H09(1997)-507308 A may be used as the reflective polarizer.

C-4. Wavelength Conversion Film

The wavelength conversion film typically includes a matrix and a wavelength conversion material dispersed in the matrix.

C-4-1. Matrix

Any appropriate material may be used as a material for forming the matrix (hereinafter sometimes referred to as matrix material). Examples of such material include a resin, an organic oxide, and an inorganic oxide. It is preferred that the matrix material have low oxygen permeability and low moisture permeability, have high light stability and high chemical stability, have a predetermined refractive index, have excellent transparency, and/or have excellent dispersibility of the wavelength conversion material. In practical use, the matrix may be formed of a resin film or a pressure-sensitive adhesive.

C-4-1-1. Resin Film

When the matrix is the resin film, any appropriate resin may be used as a resin for forming the resin film. Specifically, the resin may be a thermoplastic resin, may be a thermosetting resin, or may be an active energy ray-curable resin. Examples of the active energy ray-curable resin include an electron beam-curable resin, a UV-curable resin, and a visible ray-curable resin. Specific examples of the resin include an epoxy, a (meth)acrylate (e.g., methyl methacrylate or butyl acrylate), norbornene, polyethylene, poly(vinyl butyral), poly(vinyl acetate), polyurea, polyurethane, amino silicone (AMS), polyphenylmethylsiloxane, polyphenylalkylsiloxane, polydiphenylsiloxane, polydialkylsiloxane, silsesquioxane, silicone fluoride, vinyl and hydrogenated product-substituted silicone, a styrene-based polymer (e.g., polystyrene, amino polystyrene (APS), or poly(acrylonitrile ethylene styrene) (AES)), a polymer cross-linked with a bifunctional monomer (e.g., divinylbenzene), a polyester-based polymer (e.g., polyethylene terephthalate), a cellulose-based polymer (e.g., triacetylcellulose), a vinyl chloride-based polymer, an amide-based polymer, an imide-based polymer, a vinyl alcohol-based polymer, an epoxy-based polymer, a silicone-based polymer, and an acrylic urethane-based polymer. Those resins may be used alone or in combination thereof (e.g., a blend or a copolymer). After any such resin has been formed into a film, the film may be subjected to treatment, such as stretching, heating, or pressurization. Of those, a thermosetting resin or a UV-curable resin is preferred, and a thermosetting resin is more preferred. This is because such resin can be suitably applied to a case in which the optical member of the present invention is produced by a roll-to-roll process.

C-4-1-2. Pressure-Sensitive Adhesive

When the matrix is the pressure-sensitive adhesive, any appropriate pressure-sensitive adhesive may be used as the pressure-sensitive adhesive. The pressure-sensitive adhesive preferably has transparency and optical isotropy. Specific examples of the pressure-sensitive adhesive include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. Of those, a rubber-based pressure-sensitive adhesive or an acrylic pressure-sensitive adhesive is preferred.

C-4-2. Wavelength Conversion Material

The wavelength conversion material is capable of controlling the wavelength conversion characteristic of the wavelength conversion film. The wavelength conversion material may be, for example, quantum dots or a phosphor.

The content of the wavelength conversion material (when two or more kinds are used, the total content thereof) in the wavelength conversion film is preferably from 0.01 part by weight to 50 parts by weight, more preferably from 0.01 part by weight to 30 parts by weight with respect to 100 parts by weight of the matrix material (typically a resin or pressure-sensitive adhesive solid content). When the content of the wavelength conversion material falls within such range, a liquid crystal display apparatus excellent in balance among all the RGB hues can be achieved.

C-4-2-1. Quantum Dots

The center emission wavelength of each of the quantum dots may be adjusted on the basis of, for example, the material and/or composition, particle size, and shape of each of the quantum dots.

The quantum dots may each be formed of any appropriate material. The quantum dots may each be formed of preferably an inorganic material, more preferably an inorganic conductor material or an inorganic semiconductor material. Examples of the semiconductor material include semiconductors of Groups II-VI, Groups III-V, Groups IV-VI, and Group IV. Specific examples thereof include Si, Ge, Sn, Se, Te, B, C (including diamond), P, BN, BP, BAs, AlN, Alp, AlAs, AlSb, GaN, GaP, GaAs, GaSb, InN, InP, InAs, InSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, and $Al_2CO$. Those semiconductor materials may be used alone or in combination thereof. The quantum dots may each contain a p-type dopant or an n-type dopant. In addition, the quantum dots may each have a core-shell structure. In the core-shell structure, any appropriate functional layer (a single layer or a plurality of layers) may be formed on the periphery of a shell depending on purposes, or the surface of the shell may be subjected to surface treatment and/or chemical modification.

Any appropriate shape may be adopted as the shape of each of the quantum dots depending on purposes. Specific examples thereof include a true spherical shape, a flaky shape, a plate-like shape, an ellipsoidal shape, and an amorphous shape.

Any appropriate size may be adopted as the size of each of the quantum dots depending on a desired emission wavelength. The size of each of the quantum dots is preferably from 1 nm to 10 nm, more preferably from 2 nm to 8 nm. When the size of each of the quantum dots falls within such range, sharp emission is shown for each of green light and red light, and a high color rendering property can be achieved. For example, green light can be emitted when the quantum dots each have a size of about 7 nm, and red light can be emitted when the quantum dots each have a size of about 3 nm. When the quantum dots each have, for example, a true spherical shape, the size of each of the quantum dots is the average particle diameter, and when the quantum dots each have any other shape, the size is a dimension along the shortest axis in the shape.

The details of the quantum dots are described in, for example, JP 2012-169271 A, JP 2015-102857 A, JP 2015-65158 A, JP 2013-544018 A, and JP 2010-533976 A, the descriptions of which are incorporated herein by reference. Commercially available products may be used as the quantum dots.

C-4-2-2. Phosphor

Any appropriate phosphor capable of emitting light of a desired color depending on purposes may be used as the phosphor. Specific examples thereof include a red phosphor and a green phosphor.

An example of the red phosphor is a complex fluoride phosphor activated with $Mn^{4+}$. The complex fluoride phosphor refers to a coordination compound containing at least one coordination center (e.g., M to be described later) surrounded by fluoride ions acting as ligands, in which, as required, electric charge is compensated for by a counterion (e.g., A to be described later). Specific examples thereof include $A_2[MF_5]:Mn^{4+}$, $A_3[MF_6]:Mn^{4+}$, $Zn_2[MF_7]:Mn^{4+}$, $A[In_2F_7]:Mn^{4+}$, $A_2[M'F_6]:Mn^{4+}$, $E[M' F_6]:Mn^{4+}$, $A_3[ZrF_7]:Mn^{4+}$, and $Ba_{0.65}Zr_{0.35}F_{2.70}:Mn^{4+}$. In the formulae, A represents Li, Na, K, Rb, Cs, or $NH_4$, or a combination thereof. M represents Al, Ga, or In, or a combination thereof. M' represents Ge, Si, Sn, Ti, or Zr, or a combination thereof. E represents Mg, Ca, Sr, Ba, or Zn, or a combination thereof. Of those, a complex fluoride phosphor having a coordination number at the coordination center of 6 is preferred. The details of such red phosphor are described in, for example, JP 2015-84327 A, the description of which is incorporated herein by reference in its entirety.

An example of the green phosphor is a compound containing, as a main component, a solid solution of SiAlON having a $\beta$-$Si_3N_4$ crystal structure. Treatment for adjusting the amount of oxygen contained in such SiAlON crystal to a specific amount (e.g., 0.8 mass %) or less is preferably performed. When such treatment is performed, a green phosphor capable of emitting sharp light with a small peak width can be obtained. The details of such green phosphor are described in, for example, JP 2013-28814 A, the description of which is incorporated herein by reference in its entirety.

The wavelength conversion film may be a single layer, or may have a laminated structure. When the wavelength conversion film has a laminated structure, its layers may typically contain wavelength conversion materials having light emission characteristics different from each other.

The thickness of the wavelength conversion film (when the wavelength conversion film has a laminated structure, the total thickness thereof) is preferably from 1 μm to 500 μm, more preferably from 100 μm to 400 μm. When the thickness of the wavelength conversion film falls within such range, the wavelength conversion film can be excellent in conversion efficiency and durability. When the wavelength conversion film has a laminated structure, the thickness of each of its layers is preferably from 1 μm to 300 μm, more preferably from 10 μm to 250 μm.

The water vapor transmission rate (moisture permeability) of the wavelength conversion film in terms of a thickness of 50 μm is preferably 100 $g/m^2 \cdot day$ or less, more preferably 80 $g/m^2 \cdot day$ or less. The water vapor transmission rate may be measured under an atmosphere at 40° C. and 90% RH by a measurement method in conformity to JIS K7129.

C-4-3. Barrier Function

Irrespective of whether the matrix is the resin film or the pressure-sensitive adhesive, the wavelength conversion film preferably has a barrier function against oxygen and/or water vapor. The phrase "has a barrier function" as used herein means controlling the transmission amount of oxygen and/or water vapor penetrating into the wavelength conversion film to substantially shield the wavelength conversion material therefrom. The wavelength conversion film may express the barrier function by imparting, to the wavelength conversion material itself, a three-dimensional structure, such as a core-shell structure or a tetrapod-like structure. In addition, the wavelength conversion film may express the barrier function through appropriate selection of the matrix material.

C-4-4. Others

The wavelength conversion film may further contain any appropriate additive depending on purposes. Examples of the additive include a light diffusing material, a material for imparting anisotropy to light, and a material for polarizing light. Specific examples of the light diffusing material include fine particles each formed of an acrylic resin, a silicone-based resin, a styrene-based resin, or a resin based on a copolymer thereof. Specific examples of the material for imparting anisotropy to light and/or the material for polarizing light include: ellipsoidal fine particles in each of which birefringence on its major axis differs from that on its minor axis; core-shell type fine particles; and laminated fine particles. The kind, number, blending amount, and the like of the additives may be appropriately set depending on purposes.

The wavelength conversion film may be formed by, for example, applying a liquid composition containing the matrix material and the wavelength conversion material, and as required, the additive. For example, when the matrix material is a resin, the wavelength conversion film may be formed by applying a liquid composition containing the matrix material and the wavelength conversion material, and as required, the additive, a solvent, and a polymerization initiator to any appropriate support, and then drying and/or curing the liquid composition. The solvent and the polymerization initiator may be appropriately set depending on the kind of the matrix material (resin) to be used. Any appropriate application method may be used as an application method. Specific examples thereof include a curtain coating method, a dip coating method, a spin coating method, a print coating method, a spray coating method, a slot coating method, a roll coating method, a slide coating method, a blade coating method, a gravure coating method, and a wire bar method. Curing conditions may be appropriately set depending on, for example, the kind of the matrix material (resin) to be used and the composition of the composition. When the wavelength conversion material is added to the matrix material, the wavelength conversion material may be added in a state of particles, or may be added in a state of a dispersion liquid by being dispersed in a solvent. The wavelength conversion film may be formed on a barrier layer.

The wavelength conversion film formed on the support may be transferred to another constituent element of the optical member (e.g., a retardation film or a substrate with a conductive layer).

C-5. Laminate of Polarizing Plate and Reflective Polarizer

As described above, the second member may be any appropriate optical laminate (e.g., a laminate of any appropriate optical films, or a laminate of any appropriate optical film and any appropriate substrate). In such embodiment, the optical films, or the optical film and the substrate may be laminated with each other via the other adhesion layer 25 as illustrated in FIG. 4. As described above, the other adhesion layer 25 may be preferably formed of a light-diffusing pressure-sensitive adhesive. In one embodiment, the second member is an optical laminate in which a polarizing plate and a reflective polarizer are laminated via the other adhesion layer. The polarizing plate is a laminate including an absorption-type polarizer and a polarizer protective film on one side, or each of both sides, of the absorption-type polarizer. The absorption-type polarizer, the polarizer protective film, and the reflective polarizer are as described in the section C-1, the section C-2, and the section C-3, respectively. The light-diffusing pressure-sensitive adhesive is briefly described below.

The light-diffusing pressure-sensitive adhesive contains a pressure-sensitive adhesive and light-diffusible fine particles dispersed in the pressure-sensitive adhesive. Any appropriate pressure-sensitive adhesive may be used as the pressure-sensitive adhesive. Specific examples thereof include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. Of those, an acrylic pressure-sensitive adhesive is preferred. When the acrylic pressure-sensitive adhesive is used, a light-diffusing layer excellent in heat resistance and transparency can be obtained. The pressure-sensitive adhesives may be used alone or in combination thereof.

Any appropriate fine particles may be used as the light-diffusible fine particles. Specific examples thereof include inorganic fine particles and polymer fine particles. The light-diffusible fine particles are preferably polymer fine particles. As a material for the polymer fine particles, there are given, for example, a silicone resin, a (meth)acrylic resin (e.g., polymethyl methacrylate), a polystyrene resin, a polyurethane resin, and a melamine resin. Those resins each have excellent dispersibility in a pressure-sensitive adhesive and an appropriate refractive index difference between the resin and the pressure-sensitive adhesive, and hence a light-diffusing layer excellent in diffusing performance can be obtained. Of those, a silicone resin and polymethyl methacrylate are preferred. The shape of each of the light-diffusible fine particles may be, for example, a true spherical shape, a flat shape, or an amorphous shape. The light-diffusible fine particles may be used alone or in combination thereof. The volume-average particle diameter of the light-diffusible fine particles is preferably from 1 µm to 10 µm, more preferably from 1.5 µm to 6 µm. When the volume-average particle diameter is set to fall within the above-mentioned range, a light-diffusing pressure-sensitive adhesive having excellent light-diffusing performance can be obtained. The volume-average particle diameter may be measured with, for example, an ultracentrifugal automatic particle size distribution-measuring apparatus.

The details of the light-diffusing pressure-sensitive adhesive are described in, for example, JP 2017-68250 A, the description of which is incorporated herein by reference.

EXAMPLES

The present invention is specifically described below by way of Examples, but the present invention is not limited to these Examples. In Examples, "part(s)" and "%" are by weight unless otherwise specified.

Example 1

(Prism Sheet)

A commercially available notebook PC (manufactured by Sony Corporation, product name: "VAIO Type S") was dismantled, and a prism sheet included on its backlight side was taken out. A diffusing layer arranged on the opposite side to a prism portion was removed with ethyl acetate, and the remainder was used as a prism sheet of this Example.

(Light Source)

A backlight taken out from the notebook PC was used as a light source.

(Reflective Polarizer)

A 40-inch TV manufactured by Sharp Corporation (product name: AQUOS, product number: LC40-Z5) was dismantled, and a reflective polarizer was taken out from its backlight member. Diffusing layers arranged on both surfaces of the reflective polarizer were removed, and the remainder was used as a reflective polarizer of this Example.

(Diffuser)

A diffuser removed from the 40-inch TV was used.

(Adhesion Layer Having Void Portions)

An acrylic pressure-sensitive adhesive (sheet shape, thickness: 23 μm) was prepared. Through the use of a laser processing machine (manufactured by GCC, product name: "LaserPro Spirit", $CO_2$ laser), through-holes that were hexagonal in plan view as illustrated in FIG. 2(e) were irregularly formed in the pressure-sensitive adhesive sheet. The size of the holes in plan view was 15 mm in terms of maximum diameter, and the void ratio in plan view was 85%. No through-holes were formed in the peripheral edge portion, including four corners, of the pressure-sensitive adhesive sheet. The pressure-sensitive adhesive sheet in which the through-holes had been thus formed was used as an adhesion layer of this Example.

(Production of Optical Member)

The reflective polarizer was bonded to a polarizing plate (manufactured by Nitto Denko Corporation, product name: "SEG1425") via the acrylic pressure-sensitive adhesive. Then, the prism sheet was bonded to the reflective polarizer side of the laminate of the polarizing plate and the reflective polarizer via the adhesion layer. At this time, the prism sheet was bonded to the laminate so that its prism portion was on the opposite side to the reflective polarizer, and thus a laminate having a configuration "polarizing plate/reflective polarizer/adhesion layer/prism sheet" was obtained. The surface of the resultant laminate on its polarizing plate side was bonded to a glass plate (thickness: 0.7 mm) via the acrylic pressure-sensitive adhesive to provide a laminate having a configuration "glass plate/polarizing plate/adhesion layer/prism sheet." The diffuser was mounted on the glass plate of the resultant laminate to provide an optical member. The resultant optical member was mounted on the light source so that the prism sheet was on the light source side, and the resultant was subjected to the evaluations of (1) and (2) described below. The results are shown in Table 1.

Example 2

An optical member was obtained in the same manner as in Example 1 except that the diffuser was arranged so as to be spaced apart from the optical member by 3 mm. The resultant optical member was subjected to the same evaluations as in Example 1. The results are shown in Table 1.

Example 3

An optical member was obtained in the same manner as in Example 1 except that the diffuser was not arranged. The resultant optical member was subjected to the same evaluations as in Example 1. The results are shown in Table 1.

Comparative Example 1

An optical member was obtained in the same manner as in Example 1 except that an acrylic pressure-sensitive adhesive sheet having no through-holes formed therein was used as the adhesion layer. The resultant optical member was subjected to the same evaluations as in Example 1. The results are shown in Table 1.

(1) External Appearance

The optical members obtained in Examples and Comparative Example were each visually observed from a front direction and a direction oblique by 45°, and evaluated by the following criteria.

⊚: The pattern of the through-holes was not observed at all.

○: The pattern of the through-holes was hardly observed.

Δ: The pattern of the through-holes was slightly observed, but to such a degree as not to cause any problem in practical use.

x: The pattern of the through-holes was so remarkably observed as to cause a problem in practical use.

(2) Diffusion Illuminance

A conoscope (manufactured by Autronic-Melchers GmbH) was placed above each of the optical members obtained in Examples and Comparative Example at a predetermined distance, and brightness L was measured every 1° in all directions to calculate a light diffusion illuminance (unit: Lx). The result of the optical member of Comparative Example 1 was used as a reference (reference value: 100), and the diffusion illuminance was determined as a ratio to the reference value.

TABLE 1

| | External appearance | | Diffusion |
| --- | --- | --- | --- |
| | Front direction | Oblique direction | illuminance |
| Example 1 | ○ | ○ | 130 |
| Example 2 | ⊚ | ⊚ | 130 |
| Example 3 | ○ | Δ | 132 |
| Comparative Example 1 | ⊚ | ⊚ | 100 |

<Evaluation>

As is apparent from Table 1, according to each of Examples of the present invention, an optical member that is thin and has remarkably high brightness as compared to Comparative Example can be achieved. Further, as is apparent from the comparison of Examples 1 to 3, when the diffuser is arranged, the external appearance is improved, and when the diffuser is arranged so as to be spaced apart, the external appearance is further improved.

INDUSTRIAL APPLICABILITY

The optical member of the present invention can be suitably used for a liquid crystal display apparatus. The liquid crystal display apparatus using such optical member can be used for various applications, such as portable devices including a personal digital assistant (PDA), a cellular phone, a watch, a digital camera, and a portable gaming machine, OA devices including a personal computer monitor, a notebook-type personal computer, and a copying machine, electric home appliances including a video camera, a liquid crystal television set, and a microwave oven, on-board devices including a reverse monitor, a monitor for a car navigation system, and a car audio, exhibition devices including an information monitor for a commercial store, security devices including a surveillance monitor, and caring/medical devices including a caring monitor and a medical monitor.

REFERENCE SIGNS LIST

10 first member (prism sheet)
20 second member 30 adhesion layer
100 optical member
101 optical member
102 optical member

The invention claimed is:

1. An optical member, comprising:
 a first member having a function of converting direction of light; and
 a second member laminated on the first member via an adhesion layer,
 wherein the adhesion layer has void portions, and non-contact portions are defined at an interface between the adhesion layer and at least one of the first member and the second member, and
 wherein the adhesion layer is brought into contact with each of the first member and the second member in four corner portions of the optical member in plan view.

2. The optical member according to claim 1, wherein the adhesion layer is brought into contact with each of the first member and the second member over an entire peripheral edge portion of the optical member in plan view.

3. The optical member according to claim 1, wherein the void portions of the adhesion layer are each defined by a depressed portion of a surface uneven structure of the adhesion layer.

4. The optical member according to claim 1, wherein the void portions of the adhesion layer include a through-hole that penetrates through the adhesion layer in a thickness direction thereof.

5. The optical member according to claim 1, wherein a void ratio of the adhesion layer in plan view is from 70% to 90%.

6. The optical member according to claim 1, further comprising a diffuser on an opposite side of the second member to the first member.

7. The optical member according to claim 6, wherein the diffuser is arranged so as to be spaced apart from the second member.

8. The optical member according to claim 1, wherein the second member is a laminate of two optical films laminated via another adhesion layer, and the another adhesion layer has light diffusibility.

9. An optical member, comprising:
 a prism sheet; and
 a second member laminated on the prism sheet via an adhesion layer, the second member being a laminate of a polarizing plate and a reflective polarizer,
 wherein the adhesion layer has void portions, and non-contact portions are defined at an interface between the adhesion layer and at least one of the prism sheet and the second member,
 wherein the adhesion layer is brought into contact with each of the prism sheet and the second member in four corner portions of the optical member in plan view,
 wherein the void portions of the adhesion layer include a through-hole that penetrates through the adhesion layer in a thickness direction thereof, and
 wherein a void ratio of the adhesion layer in plan view is from 70% to 90%.

10. The optical member according to claim 9, further comprising a diffuser on an opposite side of the second member to the prism sheet.

11. The optical member according to claim 10, wherein the diffuser is arranged so as to be spaced apart from the second member.

* * * * *